United States Patent [19]

Takahashi et al.

[11] 3,983,334

[45] Sept. 28, 1976

[54] MATRIX AND EQUALIZER CIRCUIT WITH GAIN CONTROL

[75] Inventors: Nobuaki Takahashi, Yamato; Yasuo Itoh, Tokyo; Masao Kasuga, Sagamihara, all of Japan

[73] Assignee: Victor Company of Japan, Limited, Yokohama, Japan

[22] Filed: Feb. 21, 1975

[21] Appl. No.: 551,733

[30] Foreign Application Priority Data

Feb. 26, 1974 Japan .............................. 49-21888

[52] U.S. Cl. .................... 179/100.4 ST; 179/1 GQ; 179/100.4 A

[51] Int. Cl.² ......................... G11B 3/74; G11B 3/00

[58] Field of Search ............ 179/100.4 A, 100.4 ST, 179/100.1 TD, 1 A, 1 G, 1 GQ

[56] References Cited

UNITED STATES PATENTS

| | | | |
|---|---|---|---|
| 2,857,462 | 10/1958 | Lin | 179/100.4 A |
| 3,207,848 | 9/1965 | Bore | 179/100.4 A |
| 3,686,471 | 8/1972 | Takahashi | 179/100.4 ST |
| 3,821,471 | 6/1974 | Bauer | 179/100.4 ST |

*Primary Examiner*—Bernard Konick
*Assistant Examiner*—Jay P. Lucas

[57] ABSTRACT

A combined matrix and equalizer circuit comprises a matrix circuit for operating with gains on a plurality of input signals. A feedback loop feeds back from a point between output terminals of the matrix circuit and a specific one of the input terminals of the same circuit. The feedback loop causes a signal entering a specific input terminal to have a specific equalizing frequency characteristic.

4 Claims, 4 Drawing Figures

MATRIX AND EQUALIZER CIRCUIT WITH GAIN CONTROL

BACKGROUND OF THE INVENTION

The present invention relates generally to matrix and equalizer circuits and more particularly to an equalizing circuit for a multichannel record reproducing apparatus.

The matrix circuit applies the sum and difference signals into respectively individual channels in a multichannel record reproducing apparatus. An added circuit imparts a specific frequency characteristic thereby doubling as an equalizer circuit.

The discrete 4-channel record disc system shown in U.S. Pat. No. 3,686,471 provides a direct wave of the sum signal of a pair of two channels and an angle-modulated wave obtained by angle modulating a 30 KHz carrier wave responsive to the difference signal of a pair of two channels. The direct and modulated waves are superimposed and recorded on the side wall of the disc sound groove.

In order to attain interchangeability in reproduction between this 4-channel record and the conventional 2-channel stereo record, the recording process is carried out in the 4-channel recording system by causing the signals to have an equalizer characteristic comforming to the standard specification of the Record Industry Association of America (RIAA). Therefore, the 4-channel record reproducing system must equalize according to the RIAA equalizer characteristic. To obtain this specific characteristic, as described hereinafter, the multiplexed signal reproduced from the pickup cartridge is passed through an RIAA turn-over equalizer circuit. A direct-wave sum signal is obtained by further separating it therefrom as it is passed through a specific RIAA roll-off equalizer circuit.

The angle-modulated difference signal obtained by separation from the multiplexed signal which has thus passed through the RIAA turn-over equalizer circuit is then demodulated. The difference signal thus demodulated and the sum signal, which has passed through the RIAA roll-off equalizer circuit, are introduced into a matrix circuit and thereby matrixed to obtain four separate channel signals.

In the previous 4-channel record reproducing systems, this matrix circuit has an operational circuit of zero gain which is totally separate from the equalizer circuit. Therefore, since an equalizer circuit and an ordinary matrix circuit are required, the entire circuit becomes unecessarily large.

With the aim of miniaturizing the circuit, a block form or IC form may be adopted for use as the matrix circuit so that it will have gain. The noise from the equalizer circuit in the preceding stage will no longer be negligible. If the gain of the matrix circuit in IC form is made small enough to make noise negligible from the equalizer circuit, it will be necessary to provide an amplifier in the stage following the matrix circuit, in which case, the advantage of forming the matrix circuit as an IC will be lost.

SUMMARY OF THE INVENTION

Accordingly, an object of the present invention is to provide a novel and useful matrix and equalizer circuit in which the above described difficulties have been overcome. A feature of the circuit of the invention is that, in a multichannel record disc reproducing system, the above mentioned RIAA roll-off equalizer circuit and the matrix circuit can be constituted by a single circuit.

A specific object of the invention is to provide a matrix and equalizer circuit wherein the matrix circuit is in IC form or block form and is given an equalizer characteristic. By this provision, the matrix circuit, itself, has gain, and, moreover, noise is not led out.

Still another object of the invention is to provide a multichannel record disc reproducing system having a matrix and equalizer circuit formed by adding into a matrix circuit, in IC form having gain, a circuit for imparting a specific frequency characteristic so that medium and high frequency noises can be effectively removed.

Other objects and further features of the invention will be apparent from the following detailed description when read in conjunction with the accompanying drawings.

DETAILED DESCRIPTION

Figure 1:
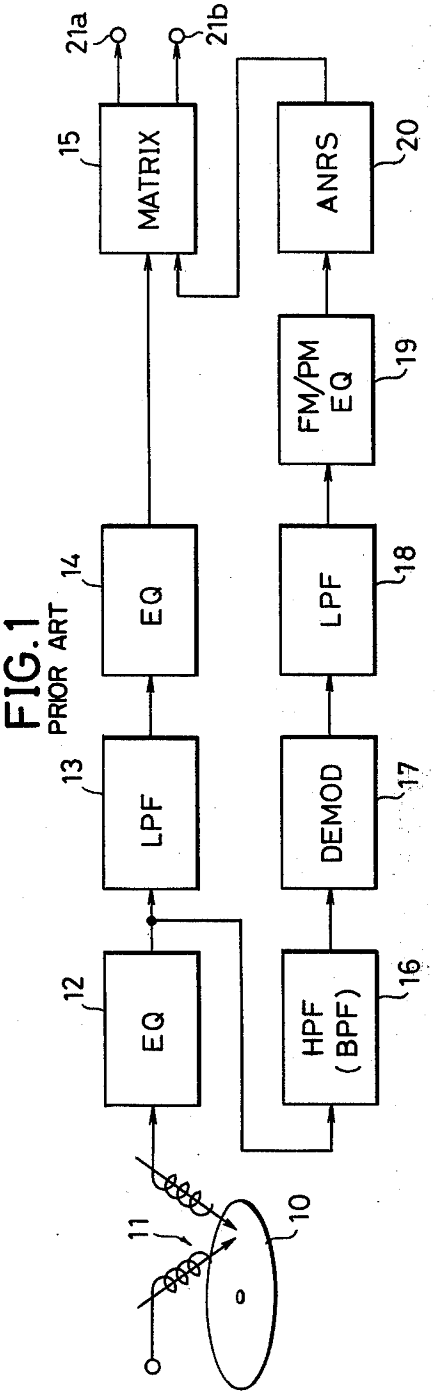
FIG.1 PRIOR ART
FIG. 1 is block diagram of one example of a multichannel record disc reproducing system of a general type, in which the matrix and equalizer circuit of the present invention can be applied.

FIG. 1 shows one example of a discrete 4-channel record disc reproducing system of a general type, in which the matrix and equalizer circuit of the invention can be applied.

Two multiplexed signals of a direct wave sum signal, each and an angle-modulated difference signal formed from each pair of two channels (first and second channels, third and fourth channels), are recorded on individually associated side walls of the sound groove of a 4-channel record disc 10, thereby recording the signals for a total of four channels. A multiplexed signal of the direct wave sum signal and the angle-modulated wave difference signal for the two-channel signal picked up from the left wall of the grooves of the disc 10, by a pickup cartridge 11, is fed to an equalizer 12 with an RIAA turn-over characteristic for equalization.

The resulting signal is fed to a low-pass filter 13 where the angle-modulated wave component is eliminated to derive the direct wave sum signal component only. The direct wave sum signal is fed to a matrix circuit 15, via an equalizer 14, provided with an RIAA roll-off characteristic.

The output of the equalizer 12 is partly fed to a high-pass filter 16 (or band-pass filter) with a pass-band in the approximate range of more than 20 KHz. An angle-modulated wave difference signal is derived from this filter. The angle-modulated wave difference signal is fed to a demodulation circuit 17 of phase locked loop (PLL) containing a phase comparator, a loop gain control circuit and a voltage controlled oscillator, etc. The demodulated output from the demodulation circuit 17 is supplied to a low-pass filter 18. The unwanted components contained in the output are eliminated thereat. The output from the low-pass filter 18 is fed to the matrix circuit 15 via, in succession, an FM/PM equalizer 19 and an automatic noise reduction system (ANRS) circuit 20 comprising an expandor which has a characteristic that compensates for the compressor in the recording system.

In the matrix circuit 15, the direct wave sum signal from the equalizer 14 and the demodulated difference signal from the ANRS circuit 20 are matrixed. From output terminals 21*a* and 21*b* are derived, for instance, the left front (the first channel) and the left rear (the second channel) signals, respectively.

While FIG. 1 shows only the circuit system for the first and second channel signals (the left channel system for the grooves of the disc 10), exactly the same circuit system (not shown) is provided for the right front (the third) and the right rear (the fourth) channel. Detailed illustration and description of this right system are omitted herein.

Figure 2:
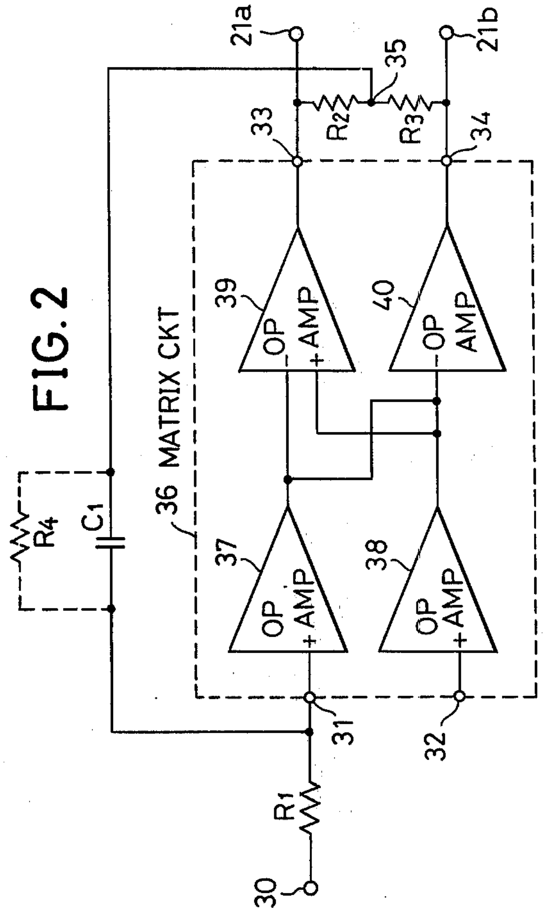
FIG. 2 is a schematic circuit diagram of one embodiment of the circuit according to the invention.

In the above described reproducing system, the equalizer 14 of RIAA roll-off characteristic was completely separate from the matrix circuit 15. In accordance with the present invention, a single circuit is used in place of these separate equalizer 14 and matrix circuit 15. One embodiment of this circuit, of the invention, is shown in FIG. 2.

The direct-wave sum signal, separated from the multiplexed signal by the low-pass filter 13 is introduced into this circuit through a terminal 30. This direct wave signal is applied by way of a resistor R1 to a sum signal input terminal 31 of a matrix circuit 36, which is in the form of an IC. The matrix circuit 36 is constituted by operational amplifiers 37, 38, 39, and 40, respectively, having gains A1, A2, A3, and A4 (where A3 = A4). The above mentioned sum signal input terminal 31 is connected to a ⊕input terminal of the operational amplifier 37. The output terminal is connected to ⊖ input terminals, respectively, of the operational amplifiers 39 and 40.

The matrix circuit 36 further has a difference signal input terminal 32 to which is applied and demodulated difference signal from the ANRS circuit 20. This difference signal input terminal 32 is connected to a ⊕ input terminal of the operational amplifier 38, the output terminal of which is connected to a ⊕input terminal of the operational amplifier 39 and to a ⊖input terminal of the operational amplifier 40. The output terminals of the operational amplifiers 39 and 40 are connected respectively to output terminals 33 and 34 of the matrix circuit 36.

These output terminals 33 and 34 are respectively connected directly to the output terminals 21a and 21b of the left front (first) and left rear (second) channel signals. In addition, they are connected together through resistors R2 and R3, which have equal resistance values (R2 = R3) and which are connected in series. The junction 35 between these resistors R2 and R3 is connected by way of a capacitor Cl to the sum signal input terminal 31, to form a negative feedback loop.

A sum signal enters through only the input terminal 31. This sum signal is amplified by the matrix circuit 36. Since the gains of the operational amplifiers 39 and 40 are A3 = A4, the output signals, respectively, have the same phase and same level at the output terminals 33 and 34. At this time, the signals through the reistors R2 and R3 to the junction 35 applied have the same phase and same potential. Accordingly, the feedback from this junction 35 may be considered equivalent to a simple feedback for the operational amplifier.

On the other hand, when a difference signal enters through only the input terminal 32, this difference signal is amplified and operated on by the matrix circuit 36. The output signals, having opposite phase and the same level, are constantly obtained through the output terminals 33 and 34. Accordingly, the junction 35, in an alternating-current manner, is constantly at ground potential, which has no effect whatsoever on the above mentioned feedback loop of the sum signal.

If a sum signal and a difference signal enter simultaneously through the input terminals 31 and 32, respectively, the feedback loop of the sum signal always operates correctly becaue of the principle of super position in a linear network.

Figure 3:
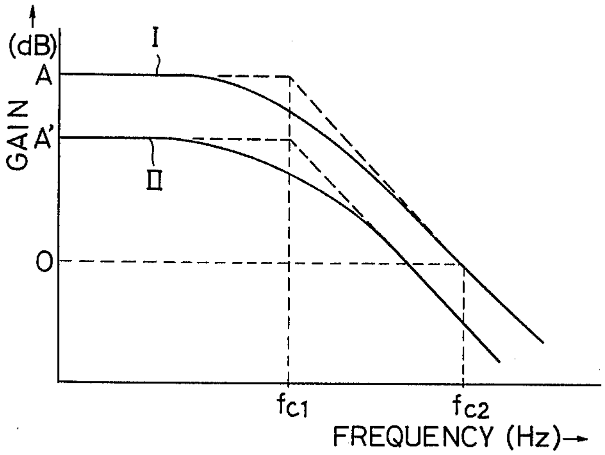
FIG. 3 is a graph indicating the RIAA roll-off equalizing characteristic of the circuit shown in FIG. 2.

The equalizing frequency characteristic, imparted to the sum signal by the circuit described above and illustrated in FIG. 2, is shown in FIG. 3. The gain A inherent with respect to the sum signal, in the matrix circuit 36 can be expressed as follows.

$$A = A1 \times A3 = A1 \times A4 \quad (1)$$

Furthermore, the frequency $fc1$ is at the point of inflection in the characteristic indicated in FIG. 3 for the circuit illustrated in FIG. 2. The frequency fc2 is the point where the gain of the matrix circuit 36 becomes zero dB. These frequencies have the following relationship.

$$fc1 = fc2/A \quad (2)$$

$$fc2 = 1/2\pi C1R1 \quad (3)$$

Therefore, from the above equations, the frequency fc1 is determined by the capacitance value Cl and the resistance value R1.

From this, the RIAA roll-off equalizer characteristics occur when the time constant $\tau$ at the frequency fc1 is, for example, 75 μsec. That is, the frequency fc1 is set at a value in the order of 2,120 Hz. At this specific RIAA roll-off equalizer characteristic the gain is decreased in the middle and high frequency band, as indicated by curve I in FIG. 3.

Consequently, the sum signal entering through the input terminal 31 acquires an RIAA roll-off characteristic, as indicated in FIG. 3 by the matrix circuit 36. At the same time, the sum signal is amplified with the difference signal introduced through the input terminal 32, whereupon a left front channel signal and a left rear channel signal are led out respectively through the output terminals 21*a* and 21*b*.

If the gain A of the matrix circuit 36 is excessively large, or the gain A1 of the operational amplifier 37 is irregularly deviating, it is possible to lower the gain of the matrix circuit 36 to A', as indicated in FIG. 3. This is done by connecting a resistor R4, as shown by a dashed line, in parallel with the capacitor Cl. In this case, however, it is necessary to so set the capacitance value Cl and the resistance value R1 so that the frequency fc1 will become a value of the order of 2,120 Hz. By this measure, an RIAA roll-off characteristic as indicated by curve II in FIG. 3 can be obtained.

Figure 4:
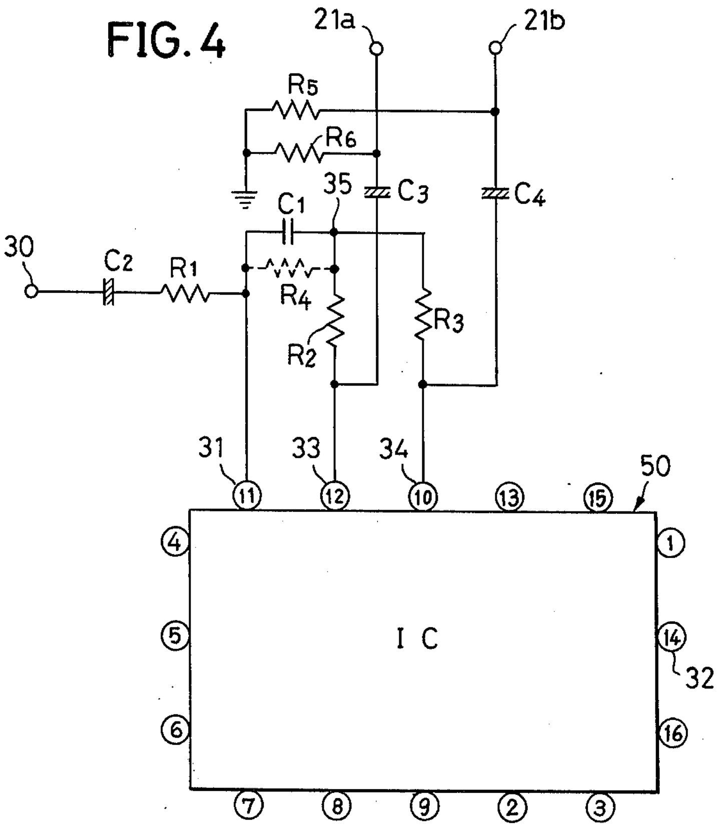
FIG. 4 is a circuit diagram of a specific and concrete embodiment of the circuit shown in FIG. 2.

One embodiment of a circuit which is obtained by making the matrix circuit 36 in IC form, together with another circuit (not shown), is shown in FIG. 4. Accessory circuits other than the matrix circuit of the invention are provided as externally added circuits of the IC. In FIG. 4, parts which are the same as corresponding parts in FIG. 2 are designated by like reference numerals and characters.

The matrix circuit 36 is made in IC form, together with another circuit (not shown) such as a demodulation circuit. They are incorporated into an integrated circuit 50 for reproduction of multichannel records. The accessory circuit comprising resistors R1, R2, and R3 (R4) and the capacitor Cl in FIG. 2 is provided as an externally added circuit, with respect to the integrated circuit 50. The input terminals 31 and 32 are, respectively, the 11th and 14th pins of the integrated circuit 50. The output terminals 33 and 34 are the 12th and 10th pins, respectively.

One example of specific constants of the various circuit elements in the above described circuit is as follows.

| Resistors | | | |
|---|---|---|---|
| R1 | 47 KΩ | R4 | 820 KΩ (for 4dB decreasing) |
| R2 | 2.2KΩ | R5 | 47 KΩ |
| R3 | 2.2KΩ | R6 | 47 KΩ |

| Capacitors | | | |
|---|---|---|---|
| C1 | 0.0033 μF | C3 | 4.7 μF |
| C2 | 4.7 μF | C4 | 4.7 μF |

Further, this invention is not limited to these embodiments but various variations and modifications may be made without departing from the scope and spirit of the invention.

What is claimed is:

1. A matrix and equalizer circuit comprising:

matrix operational circuit means having two input terminals to which are applied, respectively, sum and difference signals derived from first and second channel signals, and two output terminals through which said first and second channel signals are respectively transmitted, means in said matrix for giving gains to said sum and difference signals applied to said input terminals;

a pair of resistance elements having equal resistance value connected in series and between said output terminals of said matrix operational circuit means; and a feedback loop connected from a junction of the pair of resistance elements through a capacitor to the input terminal of said sum signal of the matrix operational circuit means, said feedback loop causing said sum signal to have a specific equalizing characteristic.

2. A matrix and equalizer circuit as claimed in claim 1, in which said feedback loop further has a resistance element connected in parallel with said capacitor.

3. A matrix and equalizer circuit as claimed in claim 1 in which said feedback loop causes said sum signal to have an RIAA roll-off equalizer characteristic.

4. A matrix and equalizer circuit as claimed in claim 1 in which said means in said matrix for giving gains to said sum and difference signals comprises first operational amplifier means having a positive input terminal connected to one of said two input terminals of said matrix operational circuit means, to which the sum signal is applied, second operational amplifier means having a positive input terminal connected to the other of said two input terminals of said matrix operational circuit means, to which the difference signal is applied, third operational amplifier means having a negative input terminal for receiving the output signal of said first operational amplifier means and a positive input terminal for receiving the output signal of said second operational amplifier means, and fourth operational amplifier means having a negative input terminal for receiving the output signals of the first and second operational amplifier means, said two output terminals of said matrix operational circuit means receiving the output signal of said third operational amplifier means and the output signal of said fourth operational amplifier means respectively.

* * * * *